United States Patent Office 3,342,856
Patented Sept. 19, 1967

3,342,856
HIGHER ALKYLPHENYL SULFAMATE SALT COMPOSITIONS
David M. Marquis, Orinda, Calif., assignor to Chevron Research Company, a corporation of Delaware
No Drawing. Filed June 9, 1964, Ser. No. 373,856
2 Claims. (Cl. 260—500)

This invention concerns novel organic sulfamate salts. More particularly it concerns higher p-alkylphenyl sulfamate salts.

The sulfamates of the present invention are useful as solubilizing agents for otherwise slow dissolving solid organic acids, as detergents, and as odorants and flavorants. Very low concentrations of these materials impart a very pleasant lemon-like taste to fumaric acid and the salts have a pleasant, distinctly sweet odor.

In accordance with the present invention, novel compounds of the general formula:

p-$RC_6H_4NHSO_3M$ are prepared using $C_{10}$–$C_{16}$ alkyl benzene precursors by a series of chemical reactions including (1) nitration with a mixture of concentrated nitric and sulfuric acid, (2) catalytic reduction of the product of (1) with hydrogen, and (3) amino-sulfonation of the product of (2) with chlorosulfonic acid and neutralization.

In a preferred embodiment of the present invention, a dodecyl benzene as obtained by the HF alkylation of benzene with a propylene tetramer polymer is employed as illustrated in the following examples:

*Example 1*

Into a three-neck reaction flask fitted for stirring, controlled addition of reagents, temperature measurement, and reflux were charged 82 grams of dodecylbenzene having an average molecular weight of 246, and an ASTM D447 distillation: 5% 533° F. and 95% 563° F. Using a concentrated sulfuric-nitric acid mixture under conventional nitration conditions, p-nitrododecylbenzene was prepared in 86% yield. It had a boiling point range 157–162° C. at 1 mm. Hg vapor pressure. Infrared analyses of the nitro derivative showed the expected bands at 6.6μ (aromatic H) and 7.45μ (nitro group).

The distilled p-nitrododecylbenzene was then hydrogenated using a Raney nickel catalyst and hydrogen at about 30 atmospheres pressure. In a separate run a rhodium on alumina catalyst was also found to be effective. 90–93.5% of theory yields of the desierd amine were recovered by distillation, B.P. 131–134° C. at 0.5 mm. Hg pressure. Infrared analysis showed the disappearance of the —$NO_2$ and appearance of the —$NH_2$ spectral bands.

The distilled amine was then reacted with a substantially stoichiometric amount of chlorosulfonic acid in the presence of a two-fold excess of the amount of triethyl amine required for neutralization of the liberated hydrogen chloride. The crude reaction product mixture was freed of solvent under vacuum and added to sufficient aqueous sodium hydroxide solution to yield a solution pH of about 7. The solvent was again removed under vacuum and the recovered solid freed of sodium chloride by extraction with a 70–30 alcohol-water solvent. Final removal of alcohol-water solvent under vacuum yielded substantially pure sodium-N-dodecylbenzene sulfamate. This material was a gummy noncrystalline solid which was highly soluble in water.

Proof of structure of the sulfamate was as follows:

(1) A short period of heating of an aliquot of the salt in acidified water in the presence of barium chloride yielded a barium sulfate precipitate (cf. Chem. Rev. 26, 49 (1940)). The isomeric product having the sulfonate group on the ring would be stable to boiling barium chloride solution.

(2) The nuclear magnetic resonance spectra of the amine precursor and of the sulfamate salt were compared. The former shows 26 side chain hydrogen atoms and 4 ring hydrogen atoms, i.e., a ratio of 6.5 The sulfamate product was found to have a corresponding ratio of 6.9. Had the sulfonation occurred on the ring rather than on the amino-nitrogen, the ratio would have been 8.7. The product was therefore substantially pure sodium-N-dodecylbenzene sulfamate.

ORGANIC ACID SOLUBILIZATION BY ORGANIC SULFAMATES

*Example 2*

To a slurry of 500 grams of powdered fumaric acid in 500 grams of water were added 10 grams of sodium N-p-dodecylbenzene sulfamate. The slurry was then stirred and spray-dried in a laboratory spray drier. The resulting powder was a free flowing nonhygroscopic powder of substantially the same size as the untreated fumaric acid. The effect of the small amount of added organic sulfamate salt upon the solubilization rate of the fumaric acid was shown by adding 0.17 parts acid to 100 parts water at 60° F. as follows:

| Fumaric acid: | Time to dissolve, min. |
|---|---|
| Untreated | >120 |
| Treated | 1 |

From the above it is seen that as little as 2.0 weight percent of a sodium-N-p-higher alkyl benzene sulfamate salt associated with solid fumaric acid increases its water solution rate by as much as a factor of 120.

SODIUM-N-DODECYLBENZENE SULFAMATE DETERGENT

*Example 3*

The product of Example 1 was formulated as a dishwashing detergent in a standard built formulation as follows:

| | Weight percent |
|---|---|
| Sodium-N-p-dodecylbenzene sulfamate | 25 |
| Trisodium polyphosphate | 40 |
| Sodium silicate | 7 |
| Carboxy methyl cellulose | 1 |
| Sodium sulfate | 19 |
| Water | ~8 | and used in a standard dishwashing test to wash grease ("Crisco") soiled plates. The above formulation foamed readily and was found to be an effective dishwashing detergent. In a separate detergency test using soiled cloth swatches in a Tergotometer, this formulation showed good cotton detergency.

In the representation of the sulfamates contemplated in the present invention, R of the above formula is a simple alkyl group by which is meant straight-chain and methyl substituted straight-chain alkyl groups having from 10 to 16 carbon atoms per group (cf. rule 6 of Div. II Hydrocarbons of the International Union Rules for Naming Organic Compounds). Attachment of the alkyl group to the benzene ring may be primary, secondary, and tertiary with respect to the linking alkyl group carbon atom.

M of the formula represents the alkaline cations sodium, potassium, ammonium, lithium, and the like. Sodium is preferred for reasons of economy. Whenever a sulfamate salt other than sodium is desired, the corresponding hydroxide, oxide, or carbonate, for example potassium carbonate, etc., is substituted for the sodium hydroxide base of Example 1.

Representatve individual organic sulfamate salts are sodium-N-p-n-hexadecylbenzene, potassium-N-p-2-decylbenzen, lithium - N - p - 1,2,3,4 - tetramethyloctylbenzene, ammonium-N-p-1-n-propyloctylbenzene, cesium-N-p-pentadecylbenzene, sodium-N-1,1-dimethyldodecylbenbene, and the like sulfamates. Cracked wax $C_{10}$–$C_{16}$ alkyl benzene sulfamate salts and their mixtures are preferred because of their ready availability by the alkylation of benzene with olefins or chloroparaffins obtained from inexpensive paraffinic hydrocarbons.

What is claimed is:
1. The organic sulfamate composition represented by the general formula:

$$p\text{-}RC_6H_4NHSO_3M$$

wherein R is selected from the group consisting of straight-chain and methyl substituted straight-chain alkyl groups having from 10 to 16 carbon atoms per group and M is an ion selected from the group consisting of alkali metal and ammonium cations.
2. Sodium-N-p-propylenetetramerbenzene sulfamate.

No references cited.

LEON ZITVER, *Primary Examiner.*
J. E. EVANS, *Assistant Examiner.*